United States Patent [19]
Reisser

[11] Patent Number: 5,964,936
[45] Date of Patent: Oct. 12, 1999

[54] OXIDIZED COLORED ALUMINIUM PIGMENTS, PROCESS FOR THEIR PRODUCTION AND THEIR USE

[75] Inventor: Wolfgang Reisser, Gossau, Switzerland

[73] Assignee: Eckart-Werke Standard Bronzepulver-Werke Carl Eckart GmbH & Co., Furth, Germany

[21] Appl. No.: 08/973,067

[22] PCT Filed: May 17, 1996

[86] PCT No.: PCT/DE96/00890

§ 371 Date: Feb. 2, 1998

§ 102(e) Date: Feb. 2, 1998

[87] PCT Pub. No.: WO96/38505

PCT Pub. Date: Dec. 5, 1996

[30] Foreign Application Priority Data

Jun. 2, 1995 [DE] Germany ............... 195 20 312

[51] Int. Cl.⁶ .................................................. C09C 1/64
[52] U.S. Cl. .................. 106/404; 106/415; 423/625; 423/627; 428/403
[58] Field of Search ................... 106/404, 415; 428/403; 423/625, 627

[56] References Cited

U.S. PATENT DOCUMENTS

| | | | |
|---|---|---|---|
| 3,067,052 | 12/1962 | Freiser et al. | 106/404 |
| 4,158,074 | 6/1979 | Uchiyama et al. | 106/404 |
| 4,328,042 | 5/1982 | Ostertag et al. | 106/403 |
| 5,037,475 | 8/1991 | Chida et al. | 106/403 |
| 5,261,955 | 11/1993 | Nadkarni | 106/404 |

FOREIGN PATENT DOCUMENTS

| | | |
|---|---|---|
| 26 27 428 A1 | 12/1976 | Germany . |
| 43 19 669 A1 | 1/1994 | Germany . |
| 60-032.853 | 2/1985 | Japan . |
| 61-130.375 | 6/1986 | Japan . |
| A 01-153.761 | 6/1989 | Japan . |

OTHER PUBLICATIONS

Derwent Abstract No. 94–017373, Abstract of German Patent Specification No. 4319669, Jan. 1994.
Derwent Abstract No. 96–354502, Abstract of German Patent Specification No. 19501307, Jul. 1996.
Derwent Abstract No. 86–199761, Abstract of Japanese Patent Specification No. 61–130375, Jun. 1986.
Besold et al., "Aluminiumpigmente Für Wässrige Beschichtungen—Widerspruch oder Wirklichkeit?," *Jahrgang*, 97, 311–314 (1991). [No Month].
Reisser et al., "Metallic Pigments for Water–Based Coatings," *PPJC*, S10–S12 (1995). [No Month].
Virin, L.I., "A Study of the Oxidation of Aluminum Powder in Aqueous Alcoholic Solutions," *J. of Appl. Chem. of the USSR*, p. 1073–1078. [No Date].

*Primary Examiner*—Anthony Green
*Attorney, Agent, or Firm*—Hoffmann & Baron, LLP

[57] ABSTRACT

The invention concerns oxidised aluminium or aluminium alloy pigments having a content of metallic aluminium of not more than 90% by weight with respect to the total weight, wherein the pigments are colored, flake-like, shiny and non-agglomerated, a process for the production thereof and use thereof as special-effect pigments and as base pigments for further colouring with organic or inorganic color pigments.

28 Claims, 1 Drawing Sheet

OXIDIZED COLORED ALUMINIUM PIGMENTS, PROCESS FOR THEIR PRODUCTION AND THEIR USE

BACKGROUND OF THE INVENTION

1. Field of the Invention

The invention concerns coloured oxidised aluminium pigments, a process for the production thereof and use thereof.

2. Description of the Prior Art

Aluminium pigments are used widely in coatings as special-effect pigments. The term special-effect pigments is used to denote pigments which have a directed reflection at oriented, metallic or highly light-refractive particles of a predominantly flat configuration (German Standard DIN 5594). They are always of a plate-like or flake-like configuration and have very large particle diameters compared with dye pigments. Their optical properties are determined by reflection and interference. Depending on transparency, absorption, thickness, single-layer or multi-layer structure, the special-effect pigments exhibit a metallic shine, a pearl shine, interference or interference reflection. The main area of use is in cosmetics and the automobile sector, and in addition in colouring plastic materials, paints, leather coatings, the printing industry and the ceramic industry. (For a comprehensive representation of the technical background, see W. Ostertag, Nachr. Chem. Tech. Lab. 1994, 9, 849).

The aluminium pigments which are most frequently used are aluminium flakes or pigments based on flake-like Cu/Zn-alloys and coated mica flakes, wherein aluminium pigments exhibit a typical metal shine whereas coated mica flakes exhibit a typical pearl shine.

In recent years the need for coloured special-effect pigments has increased greatly. Therefore for example oxide-covered copper and brass flakes, substrates which are coated with transition metal oxides such as muscovite, phlogopite or glass, guanine single-crystals (fish silver), BiOCl-single crystals, flake-form haematite single-crystals, flake-form phthalocyanines, micronised titanium dioxide, polished aluminium shot, iron oxide or crushed thin multi-layer films with a Fabry-Perot-structure were used as special-effect pigments.

In comparison, by colouring aluminium pigments, it is possible to produce coloured pigments with improved covering capability, compared with pearl shine pigments, and good colouristic options. In that respect, the colouring action is produced either by fixing colour pigments by means of polymers, by coating with oxides of different metals using a very wide range of different processes, by coating with a colour pigment-bearing oxide layer or by oxidation.

In accordance with U.S. Pat. No. 4,328,042 and EP-A-0 033 457 aluminium flakes are coloured by the deposition of iron oxide from iron pentacarbonyl, using a technically very expensive fluidised bed process. That procedure gives rise to gold-coloured aluminium pigments.

In accordance with U.S. Pat. No. 5,037,475 colour pigments are fixed on the metal surface by carboxyl group-bearing polymers. The pigments obtained however have only a low level of colour intensity.

Aluminium pigments are coloured in accordance with WO 91/04293 (PCT/US90/05236) by the fixing of polymer-coated colour pigments on the metal surface by means of electrostatic forces.

In accordance with EP-A-0 238 906 metal pigments are covered with a titanium dioxide layer by the controlled hydrolysis of an organic titanate ester compound. Various colour shades can be achieved by varying the thickness of the oxide layer. For that purpose it is necessary to observe accurately controlled reaction conditions such as pH-value and the rate of adding material by dropping. In order to achieve colour effects, it is also necessary to perform a calcination operation which however can only be carried out with difficulty, because of the low melting point of aluminium.

U.S. Pat. No. 4,978,394 describes the production of titanium dioxide-coated aluminium pigments by chemical vapour deposition (CVD) which is technically highly expensive.

U.S. Pat. No. 4,158,074 discloses the production of coloured aluminium pigments by coating with a film of hydrated metal oxide. The film is produced by the treatment of fine aluminium flakes or plate portions in an alkaline solution of an iron, nickel, cobalt, zinc or copper salt at elevated temperature by electrochemical reaction of the metal salts.

U.S. Pat. No. 5,261,955 discloses a sol-gel process for the production of coloured metal pigments, wherein the metal flakes are dispersed in a sol of an inorganic salt, dispersed after filtration in a solution of an inorganic compound, for example cobalt nitrate, in an organic solvent and finally a sol-gel layer is formed on the flakes by heating.

In accordance with DE 1 95 01 307.7 (Eckart-Werke) aluminium pigments can be coloured in a very wide range of different colour shades such as for example blue, red, violet and gold, in accordance with a process which is simple from the point of view of the apparatus used, by the controlled hydrolysis of metal acid esters in the presence of colour pigments in an organic solvent.

JP-A-61-130375 discloses a gold-coloured aluminium pigment, produced by the treatment of aluminium powder with dichromate, sodium fluoride and surface-active agents in acid solution, drying and treatment with a fatty acid derivative. Colour shades other than gold cannot be achieved with that process. In addition the toxicity of the chemicals used and their high price represent a major disadvantage of the process.

U.S. Pat. No. 3,067,052 describes coloured aluminium pigments which are produced by the oxidation of aluminium powder with $KMnO_4$-solution, possibly with the addition of a reducing agent. The colour shade of these pigments is golden, possibly also with a greenish or reddish shade, depending on the respective reducing agent used. In this case also the toxicity of the oxidising agent has a detrimental effect.

The known processes for the colouring of aluminium pigments are all complicated, expensive or disadvantageous because of the toxicity of the reagents used.

SUMMARY OF THE INVENTION

Therefore the object of the present invention is to provide coloured aluminium pigments of different colour shades with a good shine and a high level of colour intensity, which can be produced in a very simple, technically inexpensive manner by the use of harmless reagents.

That object is attained by oxidised aluminium or aluminium alloy pigments with a content of metallic aluminium of not more than 90% by weight with respect to the total weight, which are distinguished in that the pigments are coloured, flake-like, shiny and non-agglomerated.

A further aspect of the invention lies in a process for the production of the coloured oxidised metal pigments by the oxidation of flake-like metal pigments at a pH of from 7 to 12 in a mixture of water and one or more water-miscible solvents, wherein the proportion of water in the mixture is from 3 to 60% by weight with respect to the mixture, characterised in that the amount of water with respect to the metal is from 10 to 120% by weight, preferably from 15 to 55% by weight.

The invention further concerns the use of the oxidised coloured pigments as special-effect pigments and the use thereof as base pigments for coating with colour pigment-bearing oxide layers in accordance with the process disclosed in DE 1 95 01 307.7.

DETAILED DESCRIPTION OF THE PREFERRED EMBODIMENTS

Figure 1:
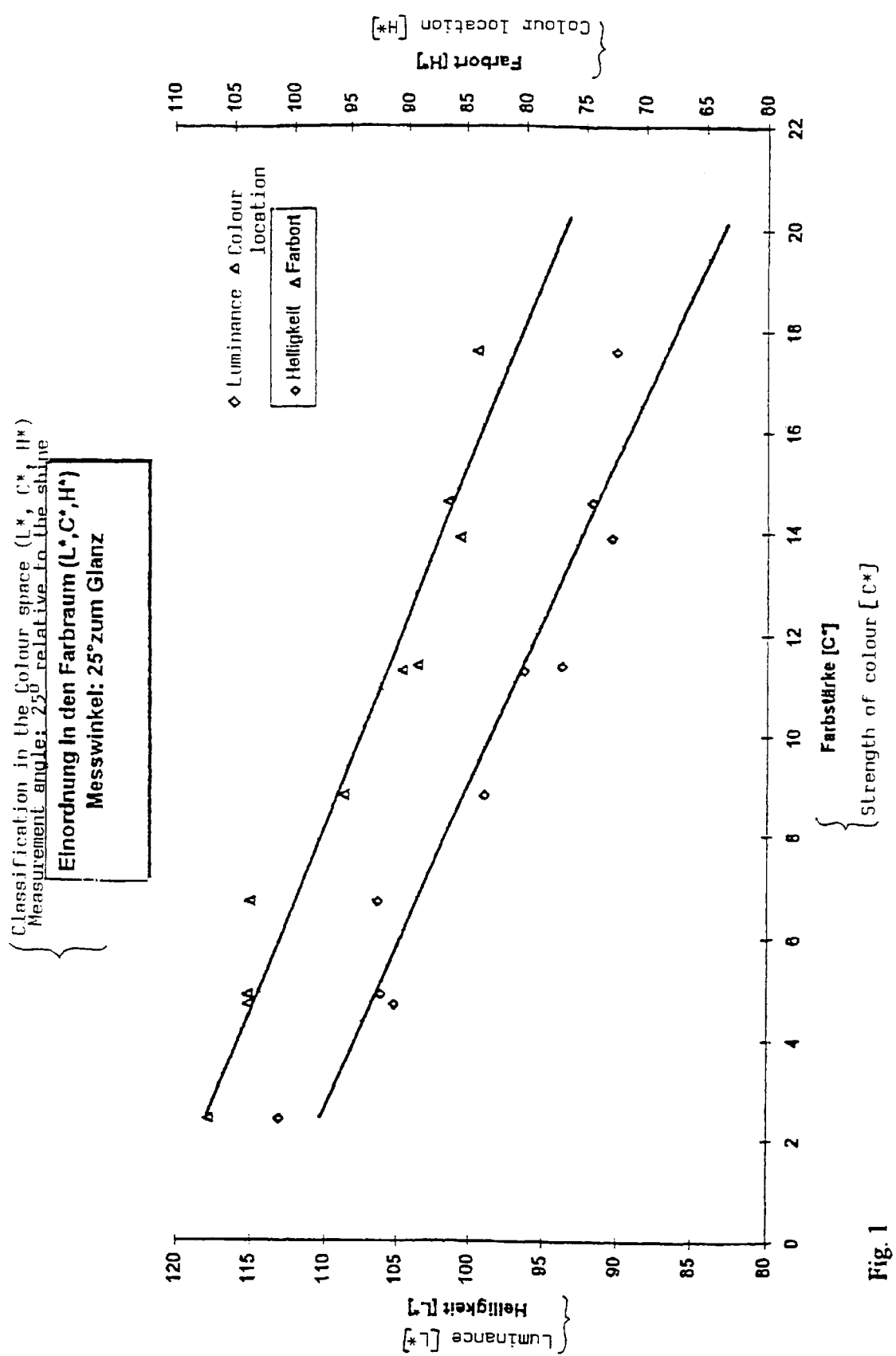
FIG. 1 is a colour space classification graph, showing measured luminance [L*] and colour location [H*] as a function of strength of colour [C*] for pigments according to the invention.

The oxidation of aluminium pigments in aqueous media usually takes place in a very highly exothermic fashion in accordance with the following equation, because of the large surface area of the pigments:

$2Al + (3+n)H_2O \text{ - - - } Al_2O_3 \cdot nH_2O + 3H_2,$ wherein the pigments are completely oxidised, with loss of the pigment properties.

Initial investigations in regard to colouring aluminium pigments by controlled oxidation in boiling alcohol dispersions and regarding the reaction mechanism involved in oxidation are already described in L. J. Virin, Zurnal prikladnoj chimii 32, No.5, 1050. In accordance with Virin, oxidation is effected in solvent mixtures with from 20 to 35% by weight proportion of water relative to the mixture. In that process the amount of water with respect to aluminium is from 400 to 700% by weight. The starting material used is a very coarse (12000 cm$^2$/g) stearic acid-coated leafing aluminium pigment which must be substantially degreased prior to the oxidation operation using acetone in an expensive procedure. This process cannot be used in a practical context however as, under the described conditions, only aluminium pigments with a matt grey to grey-brown colour are obtained, and those pigments are also so heavily agglomerated that they cannot be used as special-effect pigments.

It was now found that under specific conditions colouring of aluminium pigments is nonetheless surprisingly possible by virtue of controlled oxidation in aqueous alcohol solutions without the pigment particles agglomerating, with the loss of the pigment properties. The pigments according to the invention therefore have attractive colour shades with a high metal shine which is comparable to or even better than that of the initial pigments. The pigments according to the invention exhibit colour shades in the range from light-gold, nickel, gold, dark-gold to bronze and an excellent shine.

With increasing oxide content, the surface of the pigment flakes or plates usually becomes rougher, and in parallel therewith the pigments lose their metal shine and the colour tends towards matt, grey to grey-black shades. Conventional aluminium pigments for decorative purposes therefore generally have a metal content of about 95 to 98% by weight. Aluminium pigments for technical areas of use, for example for the production of porous concrete, fireworks or explosives typically lie between 95 and 85% by weight, in regard to metal content. Only pigments of lower quality have an even lower metal content, in exceptional cases. Surprisingly, the pigments according to the invention however exhibit excellent metal shine, with a metal content of about 20 to not more than 90% by weight. This is to be attributed to the fact that, in the production process according to the invention, in an oxidative shining procedure, grey very fine components which are present in the starting material and which possibly originate from the grinding process are dissolved up and the edges of the flakes or plates are rounded. In addition, the process claimed provides that extremely homogenous oxide layers of uniform thickness are deposited, so that the metal shine is retained.

The pigments according to the invention therefore comprise an aluminium core or a core of an aluminium alloy and a coating of hydrated aluminium oxide which is formed in accordance with the foregoing reaction equation. In the case of aluminium alloys the hydrated oxide layer contains corresponding proportions of hydrated oxides of the alloy constituents.

The colour of the pigments according to the invention becomes more intensive and darker, with an increasing degree of oxidation. It can be adjusted by varying the process parameters, in particular temperature and the amounts of water and base. The conditions which are respectively suitable for achieving a given colour shade can be easily ascertained by means of routine tests which afford information in that respect.

In comparison with their starting pigments, the oxidised products, in terms of limit grain sifting in accordance with German Standard DIN 53196 or ASTM 11, when using the same sifting mesh widths exhibit the same residue values, or up to a maximum of 2% higher residue values, than the corresponding starting materials. In comparison, the agglomerated oxidised products produced in accordance with the method of Virin with a greater excess of water have sifting residues of the order of magnitude of one to two tens percent more (see Tables 1 and 3).

In accordance with the process according to the invention, flake-like aluminium pigments are oxidised without previous degreasing in a mixture comprising one or more water-miscible solvents, water and possibly a suitable base at a pH-value of from 7 to 12, wherein the proportion of water in the solvent mixture, relative to the mixture, is from 3 to 60% by weight, preferably from 5 to 35% by weight. The amount of water relative to aluminium however is only from 10 to 120% by weight, preferably from 15 to 55% by weight. The latter value is crucial for the process according to the invention. More specifically, if the amount of water relative to aluminium is below 10% by weight, no or only very weak oxidation takes place. If it is above 120% by weight, agglomerated products are obtained.

The starting pigments used can be all aluminium pigments which are suitable for the area of decorative coatings and preparations. Non-leafing-pigments are preferably used as, in comparison with leafing-pigments of the same particle size distribution, they give shinier, more intensively coloured products. The starting pigments are preferably produced from aluminium of a minimum unit of 99.5% by weight. The starting pigments can be used both in the form of a paste and also in the form of metal powder, wherein the commercially available pastes mostly contain 65% by weight pigment proportion and 35% by weight solvent proportion, generally hydrocarbons.

The colour shade of the oxidised aluminium pigment according to the invention practically does not depend on the alloying constituents in the starting pigment, if the proportion thereof is less than 5% by weight with respect to the starting pigment. The above-mentioned colour range of from light-gold to bronze is essentially always achieved. Aluminium alloy pigments with foreign metal proportions of more than 5% by weight with respect to the starting pigment however give other colour shades such as for example yellowish, greenish, reddish and red-brownish gold shades to dark-brown and black. Suitable foreign metals are for example iron, manganese, copper, vanadium, chromium, nickel, cobalt, silicon, magnesium, zinc or titanium.

In particular alcohols, glycols and alcohols which are liquid at room temperature such as preferably ethanol, n-propanol, i-propanol, n-butanol, i-butanol, methoxypropanol, acetone or butylglycol are suitable as water-miscible solvents. It is possible to use a solvent alone or a mixture. If technical solvents which contain noticeable amounts of water are used, they are possibly to be taken into consideration when calculating the composition for the oxidation step.

The starting pigments are dispersed in the above-defined solvent-water mixture. The pH-value is possibly adjusted with suitable bases such as aliphatic or aromatic amines, ethanolamines or inorganic bases such as triethylamine, n-butylamine, i-butylamine, dimethanolamine, diethylamine, ethanol, pyridine or sodium acetate to a value of 7 to 12, and the mixture is agitated at a temperature between ambient temperature and the boiling point of the solvent mixture, preferably at 50 to 100° C.

The progress of the reaction can be followed by means of the production of hydrogen, and is as follows: an induction phase, with or without a very slight production of hydrogen, is followed by a phase with rapidly increasing, more or less stormy production of hydrogen. Finally, with increasing oxide layer thickness on the pigments, there follows a phase in which the generation of hydrogen decreases and finally comes to a halt. The reaction is carried out in accordance with the process of the invention until the production of hydrogen is concluded.

The colour scale which can be achieved can be defined by means of colour measurements using test method 1 defined below, on covering-sprayed metallic two-layer lacquer applications in the standardised CIE-Lab colour chamber (DIN 5033). Measurement is effected with a goniospectralphotometer, at a measurement angle of 25°. The colour shades which are of attraction from the colouristic point of view have at $C^*$-values between about 2 and 20 $L^*$- and $H^*$-colour co-ordinates which are related in this range with $C^*$ approximately in accordance with the formulae $L^*=116-(1.7 C^*)$ and $H^*=113-(1.9 C^*)$ (See FIG. 1). The pigments according to the invention have $L^*$-values in the range of from about 90 to about 115, $C^*$-values in the range of from about 1 to about 15 and $H^*$-values of from about 85 to about 108, while the non-oxidised starting pigments have much higher $H^*$-values of over 180 (See Table 3).

In many areas of use, for example metallic lacquers and paints for the automobile industry, the aluminium pigments are exposed to high shearing forces when being processed. That results in an impairment of the optical pigment properties by post-dispersion of agglomerated fine components, to the extent of mechanical damage to the pigment particles. For particular mechanical loadings therefore mechanically more stable special pigments have been developed. They involve very thick aluminium pigments without fine components. Admittedly, those pigments are relatively stable in relation to mechanical loadings, but they suffer from serious disadvantages such as an increased tendency to settlement in liquid media, low covering capability and poor pigment orientation upon application.

In comparison, the pigments according to the invention have excellent mechanical resistance, without the above-mentioned disadvantages. This is to be attributed to the lack of agglomerated fine component, and in particular is to be attributed to the fact that the pigment flakes or plates according to the invention comprise a metal core which is stiffened on both sides with homogenous oxide layers of uniform thickness. A necessary condition for the stiffening effect is for the oxide layers to be of a certain thickness, expressed by the metal content of the pigments of not more than 90%, preferably not more than 85%.

A suitable test method for the mechanical strength of pigments in a coating composition is the "Waring-Blender-Test" using a mixing apparatus from the company Waring (New Hartford, USA). In that procedure, the pigmented composition is subjected to a very high mechanical loading in the Waring-Blender and then, by means of an application, compared visually or by a calorimetric procedure with unloaded material (see test method 2 hereinafter). Colorimetric assessment involves determining the maximum deviation DE with a goniospectralphotometer. While conventional aluminium pigments have DE-values of over ±10 in the measurement angle range of 20 to 110°, the DE-values for commercially available ring conduit-stable special pigments are ±2 to ±5. The pigments according to the invention lie, in the case of moderately oxidised products corresponding to metal contents of about 65 to 85% by weight, in the range of ±5 DE-units. More strongly oxidised pigments according to the invention, corresponding to metal contents of below 65% by weight, achieve DE-values of below ±0.5.

In spite of their relatively thick oxide layers, the chemical stability of the pigments according to the invention, in particular in relation to water in aqueous coating compositions, is often not sufficient. The usual known processes for the chemical stabilisation of conventional aluminium pigments (see R. Besold, W. Reisser, E. Roth, Farbe+Lack 1991, 97, 311) however can be readily applied, thus for example inhibition with inorganic corrosion inhibitors or encapsulation with inorganic or organic protective layers, in which case pigments with excellent chemical stability are obtained.

The pigments can be used outstandingly as special-effect pigments in all their areas of use.

Particularly advantageous is the use thereof as a base material for additional colouring with inorganic or organic colour pigments, for example in accordance with PCT/US90/05236 or U.S. Pat. No. 5,037,475 and in particular in accordance with DE 1 95 01 307.7. By superimposing the colour of the oxidised aluminium pigments with the colour of the pigments additionally applied to the pigment surfaces, that gives pigments with new colour effects and a level of colour intensity which cannot be obtained by colouring conventional aluminium pigments with colour pigments.

The invention will be described in greater detail hereinafter by reference to Examples.

TEST METHODS

Test Method 1

Colorimetric Testing

Colorimetric testing is performed with a measurement angle of 25° with the goniospectralphotometer Multiflash M 45 of Optronik GmbH of Berlin, on the following covering-sprayed two-layer metallic lacquerings or paints.

| a) | Base lacquer | |
|---|---|---|
| | Heat-hardenable, oil-free polyester resin (Alftalat AN 950; 79% in xylyol, Hoechst) | 70 g |
| | Cellulose-acetobutyrate solution 381-1-10; (18% in butanol, Krahn) | 251 g |
| | Butylurethane-formaldehyde resin (Uresin B, Hoechst) | 11.5 g |
| | Non-plasticised highly reactive melamine formaldehyde resin (Maprenal MF 590/55% Lff.; Hoechst) | 21.5 g |
| | Highly dispersed, amorphous silicon dioxide (Aerosil 200, Degussa) | 4.0 g |
| | Butylglycol | 23 g |
| | Butylacetate/xylol 1:1 | 27 g |

16.2 g of the aluminium powders to be tested is made into a paste with 54 g of xylol and dispersed with the base lacquer. The test lacquer obtained in that way is adjusted with xylol/butylacetate/butylglycol 1:2:7 to the processing viscosity of 15 s (discharge beaker in accordance with DIN 4 mm). The lacquer is exposed to the air for 15 minutes at ambient temperature and then the clear lacquer is applied.

| b) | Clear lacquer: | |
|---|---|---|
| | Standocryl 2K-clear lacquer (Mixture of synthetic resins, Herberts) | 40 g |
| | 2K hardener short (mixture of synthetic resins, Herberts) | 20 g |
| | 2K diluent long 11012 (mixture of n-butylacetate and 2-methoxy-1-methylethylacetate, 2-methoxypropylacetate, Herberts) | 10 g |

The viscosity is set to 20 s/DIN 4mm at 20° C. The lacquer is exposed to air for 15 minutes at ambient temperature and then stoved at 130° C. Dry film layer thicknesses: base lacquer about 18 μm, clear lacquer about 40 μm.

Test Method 2
Mechanical Stability 400 g of the aluminium-pigmented base lacquer described under the heading "Colorimetric testing" is introduced into the Waring-Blender (from the company Waring, New Hartford, USA) and loaded with water cooling for a period of 8 minutes at the stage "high" and then subjected to calorimetric comparison with corresponding unloaded material, as described under Test method 1, by means of coveringly sprayed 2-layer metallic lacquers or paints.

Test Method 3
Content of Metallic Aluminium in Aluminium Pigments

A sample of the aluminium pigment is dissolved in 15% aqueous caustic soda solution. The resulting hydrogen is caught in a gas burette and serves for gas-volumetric calculation of the metal content.

Test Method 4
Metal Effect (ME) and Image Sharpness (DOI)

These values are determined on the coveringly sprayed two-layer metallic paints described in Test method 1. The metal effect ME is measured with the Zeiss goniophotometer GP 3 (illumination angle 45°, measurement angle 45° or 7° difference in relation to shine), wherein ME=reflectance at 7°/reflectance at 45°·100. Image sharpness (DOI) is measured with the Dorigon D 47 R 6 F from the company Hunter.

EXAMPLES

Comparative Examples 1 to 4

In Comparative Examples 1 and 2 in each case 5 g of leafing aluminium powder (surface area 12000 cm$^2$/g, sieve residue>71 μm 12%, 3.2% stearic acid) is firstly degreased with acetone to a residual content of 0.8% and then heated with 100 g of water/ethanol mixtures (water contents, see Table 1), with reflux, until the conclusion of the production of hydrogen. The products are sucked away by way of a Büchner funnel and respectively dried at 100° C. in a vacuum.

In Comparative Examples 3 and 4, in each case, using the same procedure, 20 g of a non-leafing aluminium pigment (Stapa Metallux 8154, sieve residue>25 μm<0.1%, Eckart-Werke) is oxidised without previous degreasing in boiling ethanol-water mixtures (water contents, see Table 1), sucked away and dried at 90° C. in a vacuum.

In all cases, matt, heavily agglomerated products of a grey colour are obtained.

The further properties of the products are summarised in Table 1.

Examples 1 to 3

50 g of aluminium pigment Stapa Metallux 8154 (Eckart-Werke) is dispersed in a solvent (nature and weighed-in portion, see Table 2). Then water and possibly a base (nature and weighed-in portions, see Table 2) are added and the mixture is heated to the boiling point thereof. After the production of hydrogen is concluded, the mixture is left to cool down to ambient temperature, it is stirred for a further 17 hours, the product is separated off by filtration and dried at 90° C. in a vacuum. The properties of the products are set forth in Table 3.

Examples 4 to 6

50 g of aluminium pigment Stapa Metallux 2154 (sieve residue>25 μm<0.5%, Eckart-Werke) is oxidised in accordance with the process from Examples 1 to 3. The results are shown in Table 3.

Examples 7 and 8

50 g of aluminium pigment Stapa Metallux 212 (sieve residue>63 μm<0.2%, Eckart-Werke) is oxidised in accordance with the process from Examples 1 to 3. The results are shown in Table 3.

Example 9

50 g of aluminium pigment Stapa Metallux 2196 (sieve residue>25 μm<0.05%, Eckart-Werke) is oxidised in accordance with the process from Examples 1 to 3. The results are set out in Table 3.

Example 10

50 g of the leafing aluminium pigment described in comparative Examples 1 and 2 are oxidised in accordance with the process from Examples 1 to 3. The results are shown in Table 3.

Examples 11 to 13

10 g of an aluminium alloy pigment (nature of the alloy, see Table 4) is dispersed in 30 ml of isopropanol. 4 g of water and 0.12 g of ethylene diamine are added and the mixture is then stirred for a period of 6 hours at 80° C. After a further 17 hours of stirring at ambient temperature, the product is separated off by filtration and dried at 90° C. in a vacuum. The colours of the oxidised products are shown in Table 4.

TABLE 1

Oxidation of aluminium pigments, Comparative Examples 1–4

| Comparative Examples | Water [g] | Water [g]/ aluminium [g] [%] | Sieve residue >25 μm [%] | Sieve residue >71 μm [%] | Metal content [%] | Colour visual | Comments |
|---|---|---|---|---|---|---|---|
| 1 | 35 | 700 | — | 70 | 51 | grey | heavily agglomerated |
| 2 | 20 | 400 | — | 45 | 64 | grey-brown | heavily agglomerated |
| 3 | 35 | 700 | >99 | — | 17 | grey | heavily agglomerated |
| 4 | 20 | 400 | >99 | — | 36 | grey-brown | heavily agglomerated |

TABLE 2

Oxidation of aluminium pigments, Examples 1–10

| Examples | Solvent | [g] | Water [g] | Water [g]/ aluminium [g] [%] | Water [g]/ solution [g] [%] | Base | [g] |
|---|---|---|---|---|---|---|---|
| 1 | 2-propanol | 118 | 23 | 46 | 16 | ethylenediamine | 0.6 |
| 2 | 2-propanol | 118 | 11 | 22 | 9 | ethylenediamine | 0.6 |
| 3 | ethanol | 196 | 20 | 40 | 9 | — | — |
| 4 | methoxypropanol | 121 | 26 | 52 | 18 | ethylenediamine | 0.6 |
| 5 | 2-propanol | 118 | 23 | 46 | 16 | butylamine | 1.4 |
| 6 | acetone | 119 | 20 | 40 | 14 | ethylenediamine | 0.6 |
| 7 | 2-propanol | 118 | 20 | 40 | 14 | ethylenediamine | 1.2 |
| 8 | 2-propanol | 118 | 8 | 16 | 13 | ethylenediamine | 1.2 |
| 9 | 2-propanol | 236 | 40 | 80 | 14 | ethylenediamine | 0.6 |
| 10 | 2-propanol | 118 | 20 | 40 | 14 | ethylenediamine | 0.6 |

TABLE 3

Product properties: Examples 1–10

| Examples | Metallic aluminium [%] | Sieve residue >25 μm [%] | Sieve residue >63 μm [%] | Sieve residue >71 μm [%] | Waring blender test [dE*] 25° | Waring blender test [dE*] 45° | Waring blender test [dE*] 70° | Colour visual | Kind of light D65/10 L* | Kind of light D65/10 C* | Kind of light D65/10 H* | DOI- value | ME- value |
|---|---|---|---|---|---|---|---|---|---|---|---|---|---|
| Starting material | 97 | 0.1 | — | — | 5.4 | 8.7 | 9.1 | silver | 106.6 | 1.3 | 225.0 | 71 | 290 |
| 1 | 56 | 0.8 | — | — | 0.4 | 0.3 | 0.4 | bronze | 96.2 | 11.3 | 90.7 | 70 | 357 |
| 2 | 74 | 0.6 | — | — | 1.1 | 0.7 | 1.1 | nickel | 105.2 | 4.7 | 104.0 | 56 | 278 |
| 3 | 58 | 1.5 | — | — | 0.2 | 0.2 | 0.1 | light gold | 106.3 | 6.7 | 103.8 | 60 | 289 |
| Starting material | 98 | 0.5 | — | — | 9.6 | 7.0 | 10.3 | silver | 107.3 | 1.2 | 219.9 | 72 | 430 |
| 4 | 55 | 1.1 | — | — | 0.3 | 0.3 | 0.2 | bronze | 98.9 | 8.8 | 95.8 | 75 | 567 |
| 5 | 57 | 0.3 | — | — | 1.4 | 1.7 | 0.6 | bronze | 93.7 | 11.4 | 89.4 | 68 | 500 |
| 6 | 62 | 1.0 | — | — | 0.4 | 0.8 | 0.4 | dark gold | 90.3 | 13.9 | 85.7 | 66 | 520 |
| Starting | 99 | — | 0.2 | — | 11.1 | 16.7 | 21.9 | silver | 110.2 | 0.8 | 185.4 | 44 | 810 |

TABLE 3-continued

Product properties: Examples 1–10

| Examples | Metallic aluminium [%] | Sieve residue >25 μm [%] | Sieve residue >63 μm [%] | Sieve residue >71 μm [%] | Mechanical stability Waring blender test [dE*] 25° | 45° | 70° | Colour visual | Colorimetry 25° Kind of light D65/10 L* | C* | H* | DOI-value | ME-value |
|---|---|---|---|---|---|---|---|---|---|---|---|---|---|
| material 7 | 80 | — | 1.1 | — | 3.3 | 1.6 | 1.0 | dark gold | 91.6 | 14.6 | 86.7 | 40 | 930 |
| 8 | 89 | — | 1.0 | — | 2.0 | 8.3 | 6.4 | nickel | 113.1 | 2.4 | 107.3 | 40 | 1320 |
| Starting material | 96 | 0.5 | — | — | 2.3 | 1.0 | 2.2 | silver | 105.9 | 1.7 | 232.4 | 89 | 175 |
| 9 | 27 | 0.5 | — | — | 0.1 | 0.1 | 0 | nickel | 106.1 | 4.9 | 104.0 | 66 | 100 |
| Starting material | 96 | — | — | 12 | 15.2 | 9.0 | 15.8 | silver | 107.7 | 1.1 | 211.5 | 40 | 350 |
| 10 | 70 | — | — | 12 | 1.6 | 2.7 | 3.2 | bronze | 98.9 | 8.8 | 95.8 | 40 | 557 |

TABLE 4

Oxidation of aluminium alloy pigments

| Example | Alloy | Colour after oxidation |
|---|---|---|
| 11 | Al/5Y | gold |
| 12 | Al/20 Ni/12.5 Si/9.5 Cu/ 0.6 Fe/0.75 Mn | black |
| 13 | Al/2 Si/2.2 Fe/0.6 Cu/ 1.2 Mn/3 Mg/0.5 Cr/Zn/0.3 Ti | brown-gold with pink gleam |

I claim:

1. An oxidized aluminum pigment, having a content of metallic aluminum of not more than 90% by weight with respect to total weight, wherein the pigment is colored, shiny, non-agglomerated, has a flaked particle configuration and, contains a substantially homogeneous oxide layer of a substantially uniform thickness.

2. A pigment according to claim 1, wherein the oxidised aluminium pigment is an oxidised aluminium alloy pigment.

3. A pigment according to claim 1, wherein the pigment has a metal effect of at least 100.

4. A pigment according to claim 3, wherein the metal effect is at least 300.

5. A pigment according to claim 1, wherein the pigment is of a colour in the range of nickel, light-gold, gold, dark-gold, to bronze.

6. A pigment according to claim 1, which comprises an aluminum alloy which contains at least one non-aluminum metal in an amount of more than 5% by weight of the aluminum alloy.

7. A pigment according to claim 6, wherein the non-aluminum metal is selected from the group consisting of iron, manganese, copper, vanadium, chromium, nickel, cobalt, silicon, magnesium, zinc, and titanium.

8. A pigment according to claim 1, which is chemically stabilised.

9. A pigment according to claim 8, which is stabilised by encapsulation with a protective layer.

10. A pigment according to claim 9, which is stabilized with a corrosion inhibitor.

11. A special-effect pigment comprising an oxidized aluminum pigment as described in claim 1.

12. A base pigment for coating with a color pigment-bearing metal oxide layer comprising an oxidized aluminum pigment as described in claim 1.

13. A process for the production an oxidized aluminum pigment, comprising:

oxidizing an aluminum pigment having a flaked particle configuration at a pH of between 7 and 12 in a mixture of water and at least one water-miscible solvent, wherein the proportion of water in the mixture is between 3% and 60% by weight with respect to the mixture, and wherein the amount of water in the mixture is between 10 and 120% by weight with respect to the metal, thereby providing an oxidized aluminum pigment having a content of metallic aluminum of not more than 90% by weight with respect to the total weight of the pigment.

14. A process according to claim 13, wherein the aluminium pigment is an aluminium alloy pigment.

15. A process according to claim 13, wherein the amount of water in the mixture relative to the aluminium pigment is between 15 and 55% by weight.

16. A process according to claim 13, wherein the aluminium pigment is produced from aluminium of a minimum unit of 99.5% by weight.

17. A process according to claim 13, wherein the water-miscible solvent is selected from the group consisting of alcohols, glycols, and ketones which are liquid at ambient temperature.

18. A process according to claim 17, wherein the water-miscible solvent is selected from the group consisting of ethanol, n-propanol, i-propanol, n-butanol, i-butanol, methoxypropanol, acetone, and butylglycol.

19. A process according to claim 13, wherein said oxidizing process takes place at a temperature range between ambient temperature and the boiling point of the mixture of water and solvent.

20. A process according to claim 13, further comprising adjusting the pH of the mixture with a base.

21. A process according to claim 20, wherein the base is selected from the group consisting of triethylamine, n-butylamine, dimethylethanolamine, diethylamine, pyridine, and sodium acetate.

22. A process according to claim 13, wherein said oxidizing process takes place at a temperature ranging between 50° C. and 100° C.

23. An oxidized aluminum pigment, having a content of metallic aluminum of not more than 90% by weight with respect to the total weight, wherein the pigment is shiny and non-agglomerated, has a flaked particle configuration, contains a substantially homogeneous oxide layer of a substantially uniform thickness, and is of a color in the range from nickel, light-gold, gold, dark-gold, to bronze.

24. A pigment according to claim 23, wherein the oxidized aluminum pigment is an oxidized aluminum alloy pigment.

25. The pigment according to claim 23, wherein the pigment has a metal effect of at least 100.

26. A pigment according to claim 25, wherein the metal effect is at least 300.

27. A pigment according to claim 23, which comprises an aluminum alloy containing at least one non-aluminum metal in an amount of more than 5% by weight of the aluminum alloy.

28. A pigment according to claim 27, wherein the non-aluminum metal is selected from the group consisting of iron, manganese, copper, vanadium, chromium, nickel, cobalt, silicon, magnesium, zinc, and titanium.

* * * * *

UNITED STATES PATENT AND TRADEMARK OFFICE
CERTIFICATE OF CORRECTION

PATENT NO. : 5,964,936
DATED : October 12, 1999
INVENTOR(S) : Reisser

It is certified that error appears in the above-indentified patent and that said Letters Patent is hereby corrected as shown below:

<u>In Column 11, Line 66, (Claim 13, Line 1)</u>   now reads "A process for the production an oxidized aluminum.";
should read --A process for the production of an oxidized aluminum--

Signed and Sealed this

Twenty-seventh Day of June, 2000

Attest:

Attesting Officer

Q. TODD DICKINSON

Director of Patents and Trademarks